United States Patent [19]

Kennel

[11] 4,005,766
[45] Feb. 1, 1977

[54] WEAR INDICATOR FOR BRAKE LINING

[76] Inventor: Richard Kennel, 34-10 43rd St., Long Island City, N.Y. 11101

[22] Filed: Sept. 12, 1975

[21] Appl. No.: 612,828

[52] U.S. Cl. .............................. 188/1 A; 116/114 Q
[51] Int. Cl.² ........................................ F16D 66/02
[58] Field of Search ................. 116/114 Q; 188/1 A

[56] References Cited
UNITED STATES PATENTS 3,592,295   7/1971   Kennel ............................... 188/1 A

*Primary Examiner*—Duane A. Reger
*Attorney, Agent, or Firm*—Allison C. Collard

[57] ABSTRACT

A device for indicating the wear of a brake lining on a brake shoe consisting of a stud having a central aperture and secured within the opening of the brake shoe, and a rivet pin slidably disposed in the aperture of the stud and having an enlarged head disposed a predetermined depth below the wearing surface of the lining, and a spring indicating means coupled to the opposite end of said rivet pin and secured to the stud for biasing the rivet with a withdrawal force with respect to the stud so that when the head of the rivet pin is worn away at a predetermined brake lining depth, the pin will be withdrawn from the lining and a free projecting end of the spring will engage the rotating brake drum to produce an audible warning sound. In another embodiment a rivet is used only to secure the spring to the brake shoe. In other embodiments the rivet is eliminated and the spring is used in conjunction with a stud so that when the stud wears away, the spring will project against the rotating brake drum.

10 Claims, 31 Drawing Figures

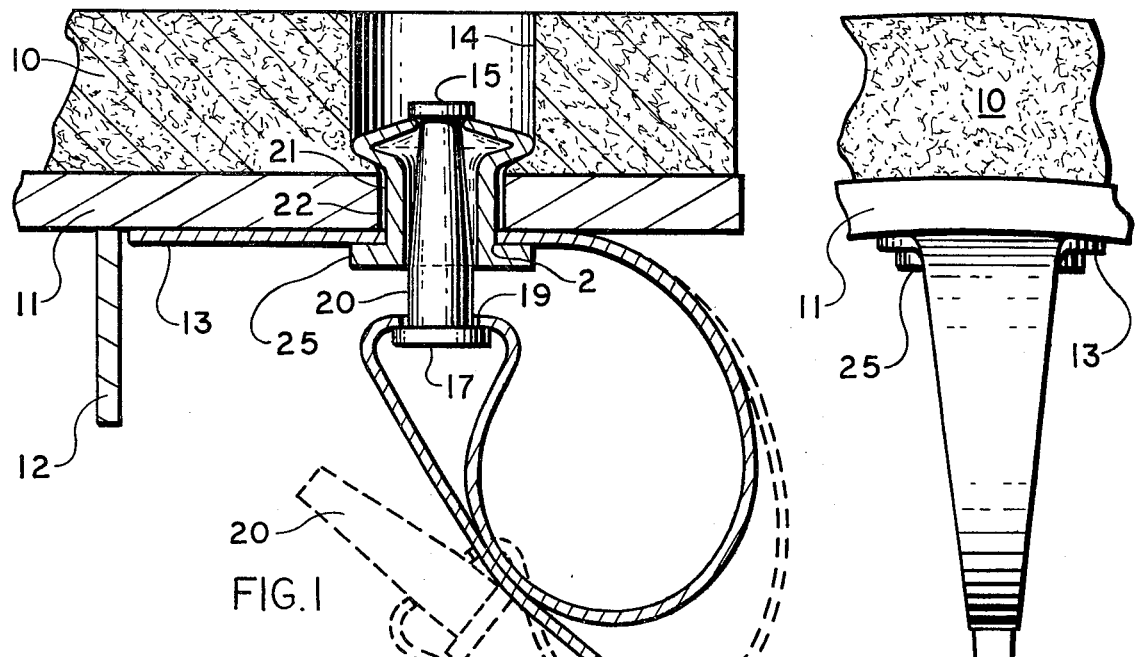
FIG. 1
FIG. 2
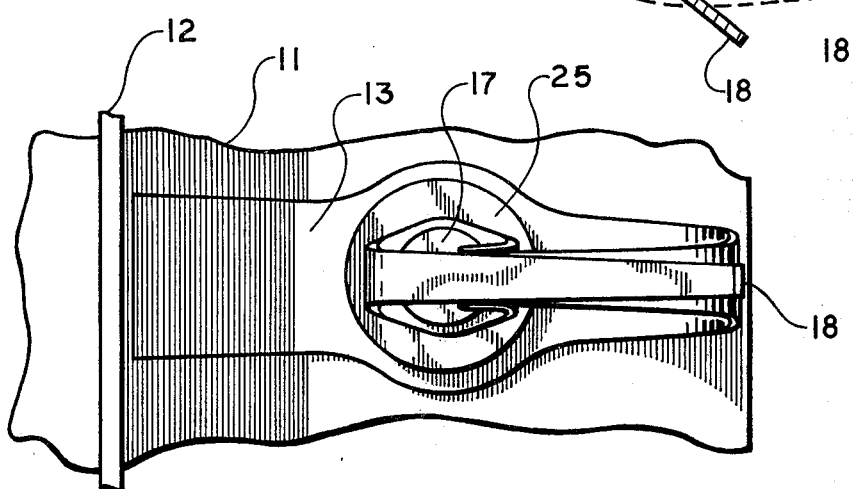
FIG. 3
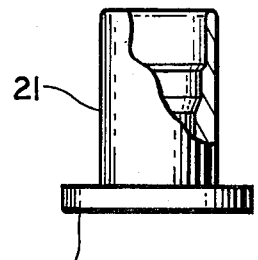
FIG. 4
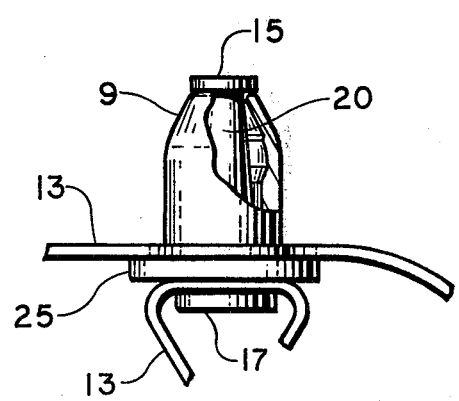
FIG. 5

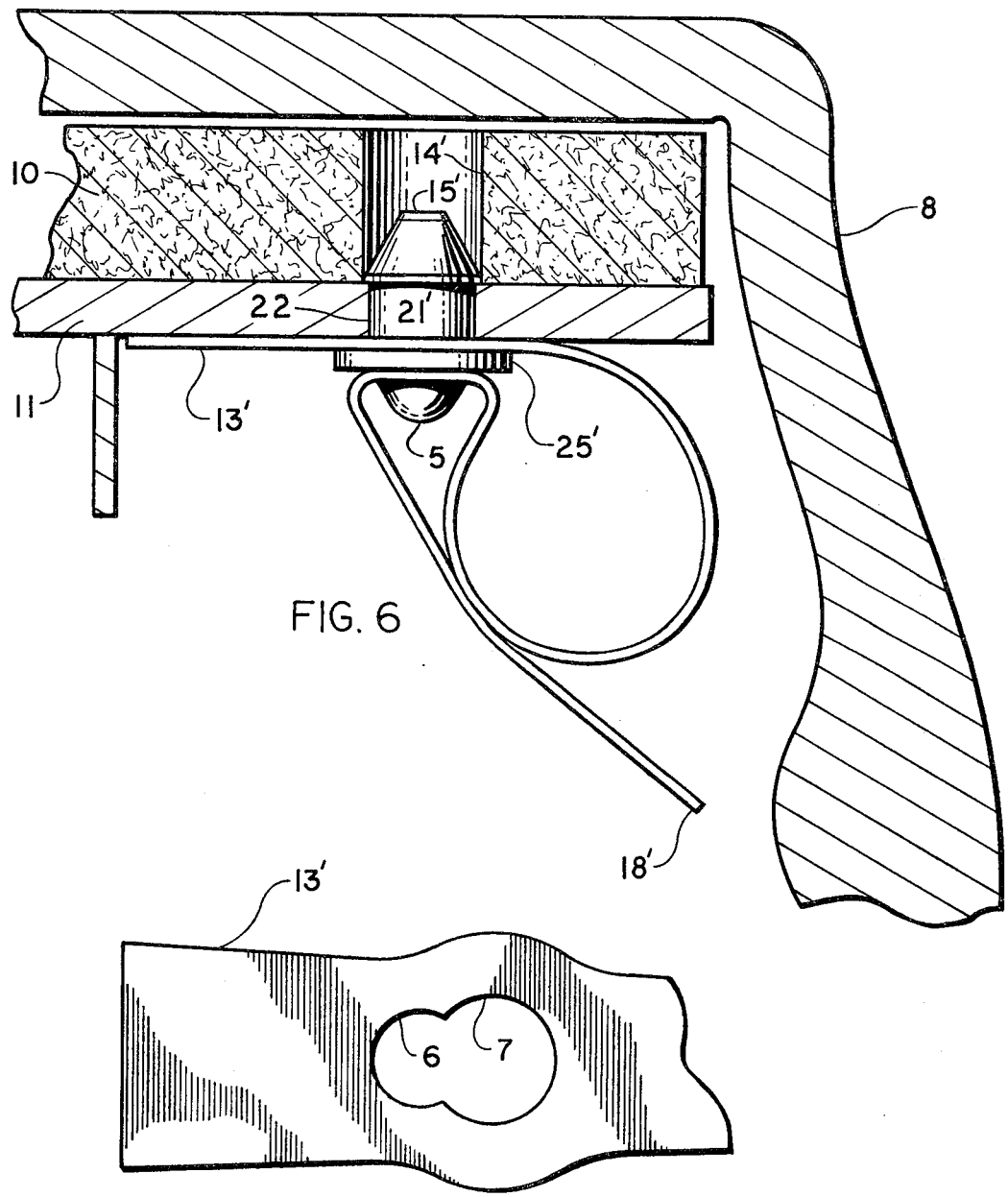
FIG. 6
FIG. 7
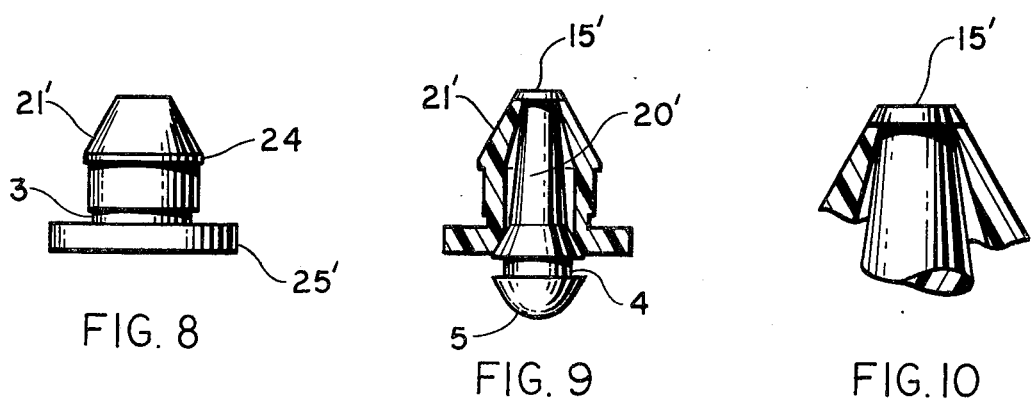
FIG. 8
FIG. 9
FIG. 10

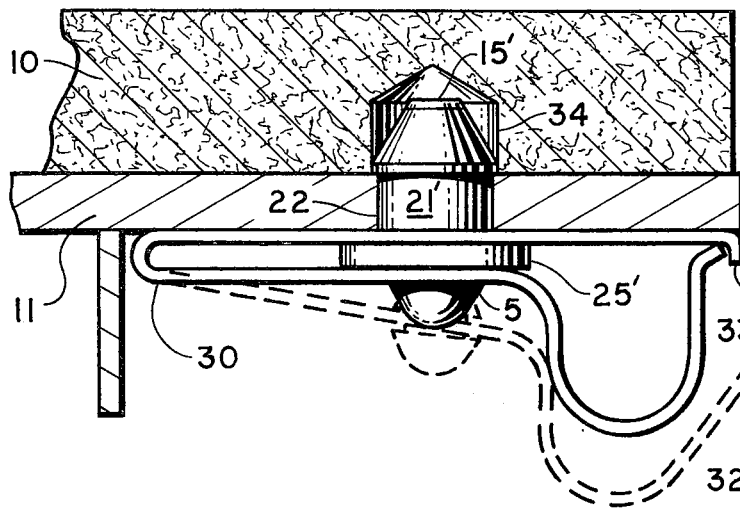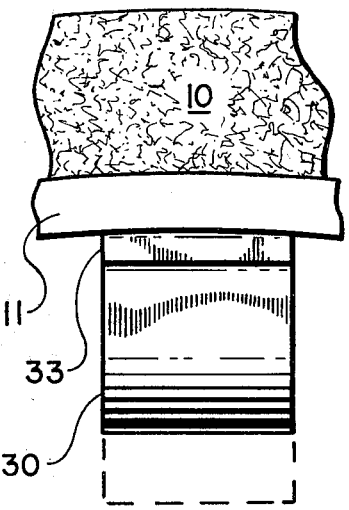
FIG. 11  FIG. 12
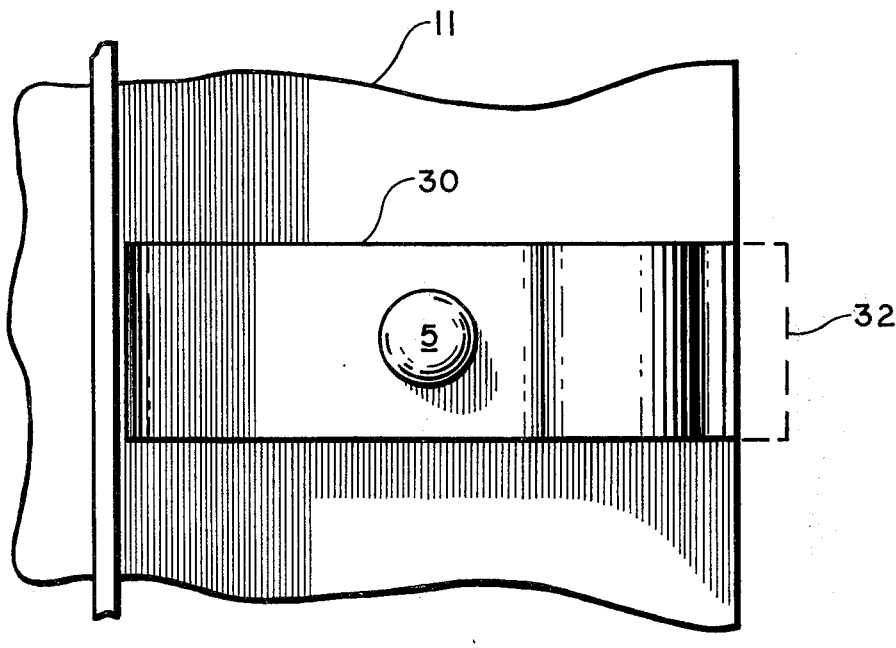
FIG. 13

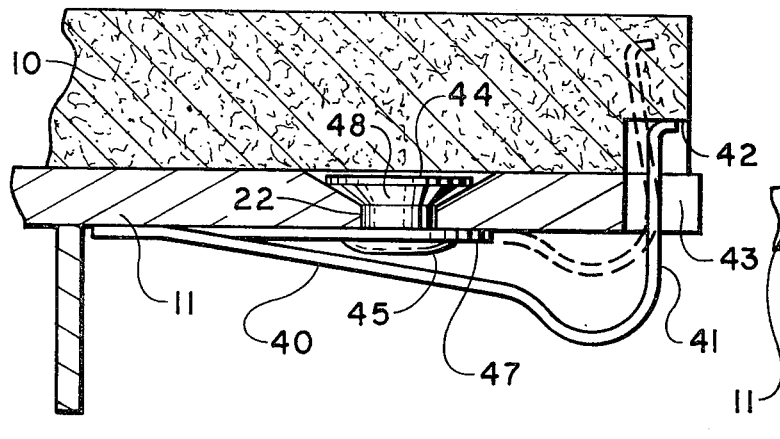 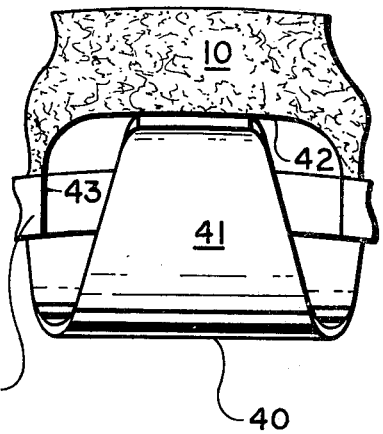
FIG. 14  FIG. 15
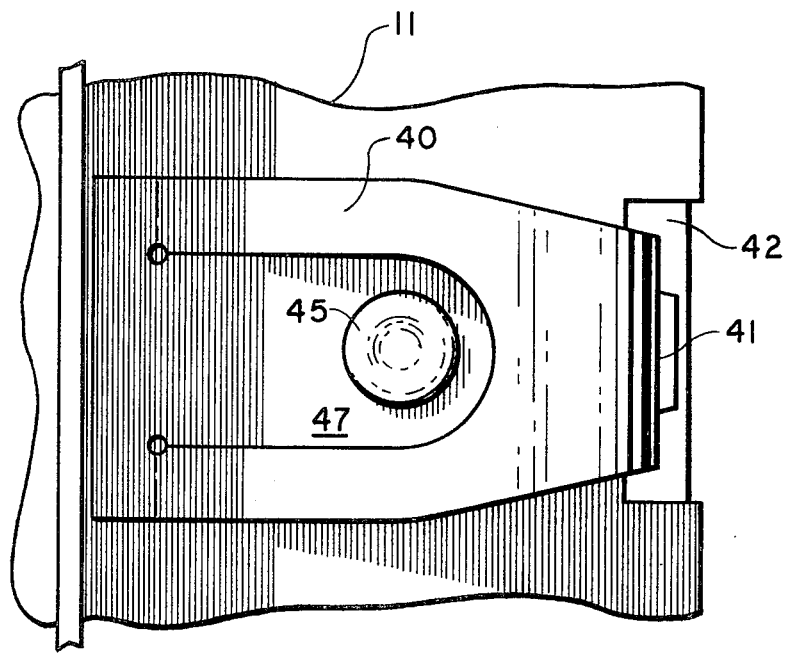
FIG. 16

WEAR INDICATOR FOR BRAKE LINING

This invention relates to a wear indicating signalling device for vehicle brake linings.

More specifically, this invention relates to a plurality of simplified arrangements which can be easily installed on a vehicle during manufacture or at a later date, to indicate the state of wear of a brake lining in order to advise the user concerning its replacement.

In most motor vehicles of the present time, there are no warning devices to provide the motorist with an indication of the wear or condition of the brake linings of his vehicle without disassembling the brake drums. For some vehicles, the brake drums are not easily removed but require the use of a brake drum puller before a mechanic can view the condition of the brakes. For many motorists, the condition of their brake linings is estimated by having the brakes of the car changed, such as, for example after every 20,000 or 30,000 miles of use. In many cases where driving conditions are moderate, this frequent change of brake linings is unnecessary and adds additional cost to the maintainence of the vehicle.

In the prior art, such as in U.S. Pat. Nos. 3,385,256 and 3,407,906, there are a number of complicated mechanical devices disclosed which provide an audible indication of the condition of the brake linings when the linings have reached a predetermined level of wear. One of the disadvantages of the devices of the prior art is that they require several additional steps and separate fastening devices for installing the indicating apparatus onto the vehicle brake lining.

Accordingly, the present invention provides a simplified brake lining wear indicating device that requires no separate fastening devices and can be easily installed with a minimum number of parts. The war indicating device of the present invention is designed to release when the brake lining reaches a predetermined depth on the brake shoe and cause a continuous audible noise to the motorist whether or not the brakes are being applied. The indicating device of the present invention is designed to contact a portion of the moving brake drum so that the noise will resonate within the brake drum area and alert the motorist of the condition of his brake linings.

It is therefore an object according to the present invention to provide a brake lining wear indicating device which uses a minimum number of parts for indicating a predetermined thickness of the brake lining of a vehicle's braking system.

It is another object according to the present invention to provide a brake lining wear indicating device which is simple in design, easy to manufacture and install, and reliable in operation.

Other objects and features of the present invention will become apparent from the following detailed description considered in connection with the accompanying drawings which disclose the embodiments of the invention. It is to be understood however that the drawings are designed for the purpose of illustration only and not as a definition of the limits of the invention.

In the drawings, wherein similar reference characters denote similar elements throughout the several views:

FIG. 1 is a cross sectional view of a riveted brake shoe showing the installation of a first embodiment of the novel indicating device of the invention;

FIG. 2 is a side elevation view thereof;

FIG. 3 is a bottom view thereof;

FIG. 4 is a partial cross sectional view of the stud used in the inventive device of FIG. 1;

FIG. 5 is a partial cross sectional view of the assembled device prior to installation;

FIG. 6 shows a second embodiment of the invention in partial cross sectional view installed in a riveted brake shoe;

FIG. 7 is a top view of the base portion of the flat spring showing double sized openings which engage the stud;

FIG. 8 is a side view of the stud showing an optional annular groove;

FIG. 9 is a cross sectional view of the stud used in the embodiment of FIG. 6 showing a trigger release pin;

FIG. 10 is an enlarged cross sectional view at the top portion of the stud and the trigger release pin of FIG. 9;

FIG. 11 is a partial cross sectional view of still a further embodiment of the invention showing a snap-fit installation;

FIG. 12 is an end view of the installation of FIG. 11;

FIG. 13 is a bottom view of the installation of FIG. 11;

FIG. 14 is still a further embodiment of the invention in partial cross sectional view installed in a brake shoe;

FIG. 15 is an end view of the embodiment of FIG. 14;

FIG. 16 is a bottom view of the embodiment of FIG. 14;

Figures 17, 18:
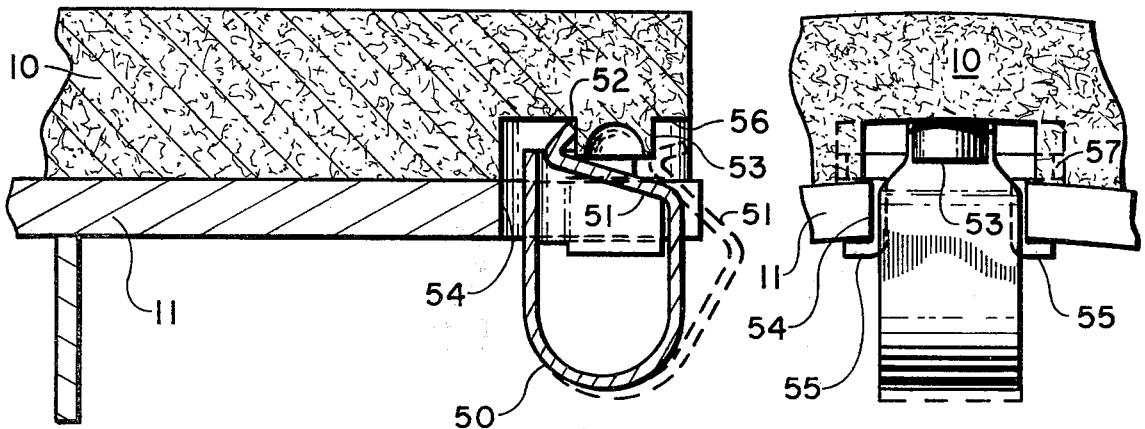
FIG. 17 shows a further embodiment of the invention installed in a brake lining.
FIG. 18 is an end view of the embodiment of FIG. 17.
Figures 19, 20:
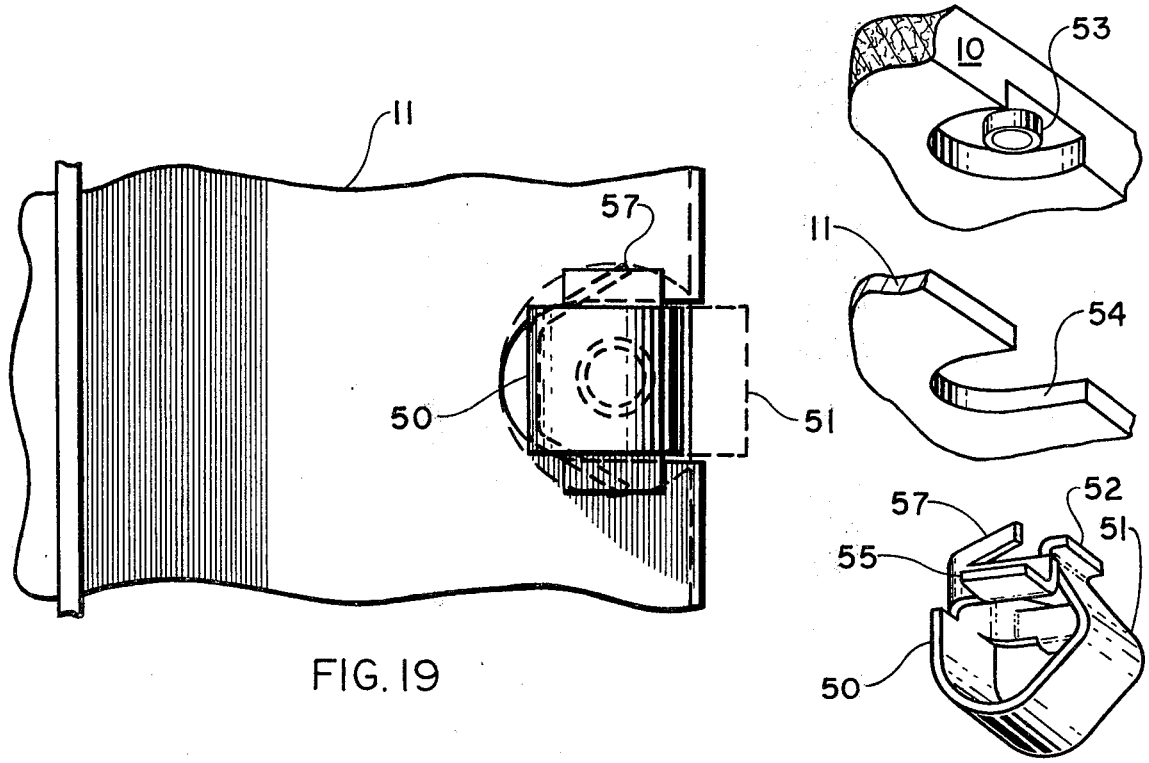
FIG. 19 is a bottom view of the embodiment of FIG. 17.
FIG. 20 is an exploded view showing the assembly of the embodiment of FIG. 17.
Figures 21, 22:
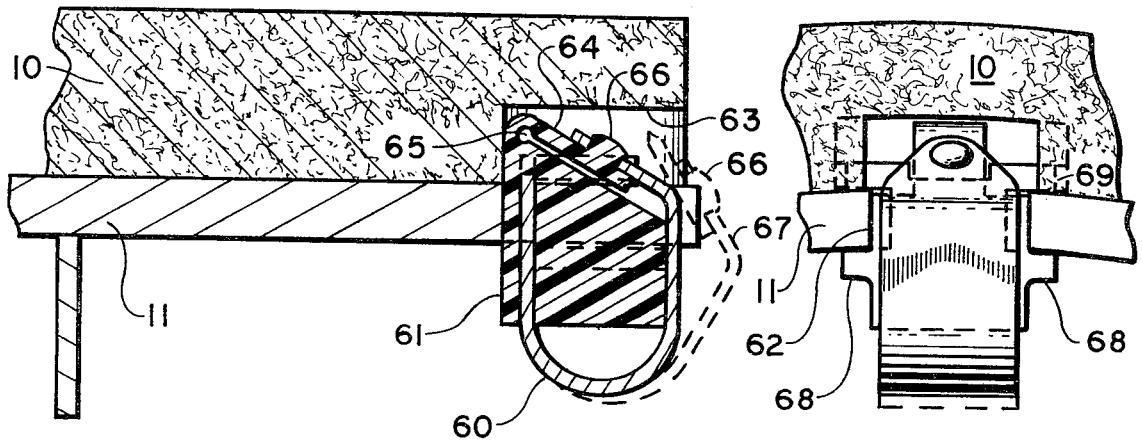
FIG. 21 is still a further embodiment of the invention installed in a brake shoe.
FIG. 22 is an end view of the embodiment of FIG. 21.
Figures 23, 24:
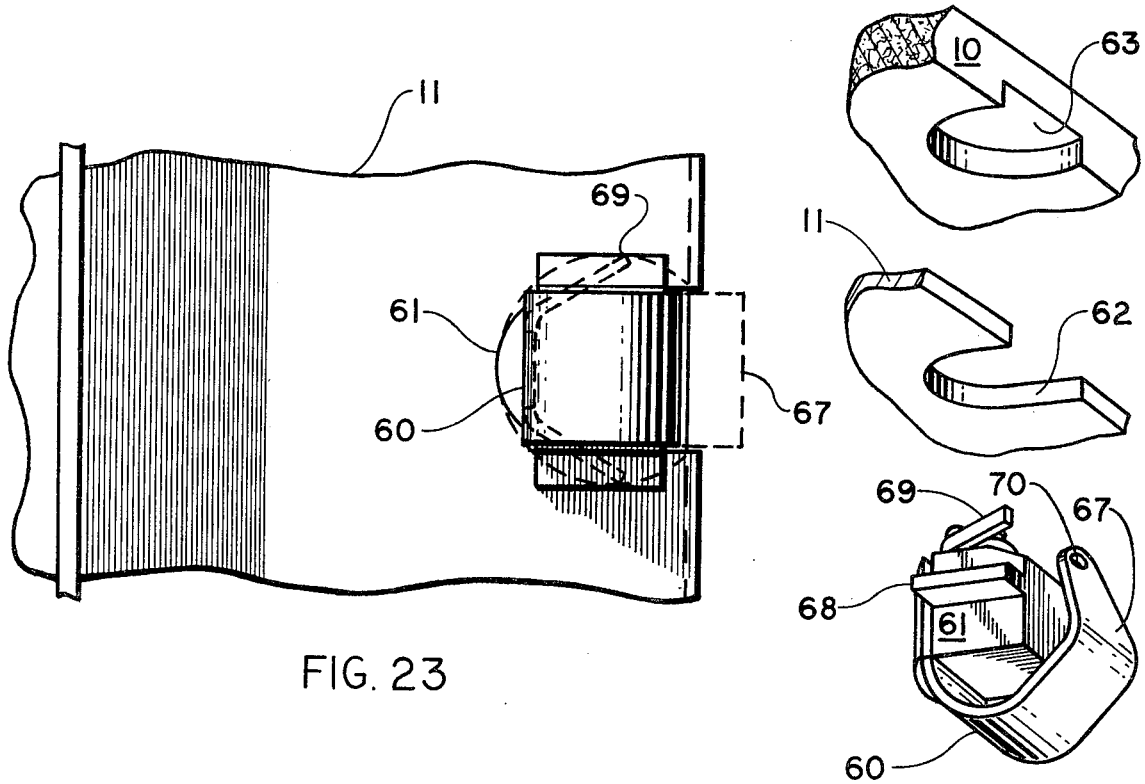
FIG. 23 is a bottom view of the embodiment of FIG. 21.
FIG. 24 is an exploded view showing the assembly of the embodiment of FIG. 21 into a brake lining.
Figure 25:
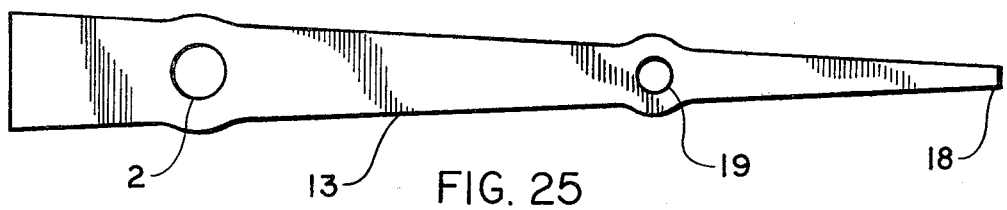
FIGS. 25–30 show different embodiments of signal indicating levers which are used in the embodiments of FIGS. 1–24.

Referring to FIGS. 1–5 there is shown a first embodiment of the invention disposed within a brake lining 10 which is bonded or riveted to a brake shoe having a shoe surface 11 mounted on a shoe structure 12. Brake lining 10 includes a recessed opening 14 into which is disposed a hollow stud structure 21. Opening 14 is larger in diameter than the opening 22 formed in top surface 11 of the shoe so that a central rivet 20 having a head 15 and a flat bottom portion 17 can be swaged into the stud 21. A flat spring metal indicator 13 having an opening the same size as the diameter of stud 21 but smaller than the base 25 of the stud is inserted on the opposite side of surface 11. Spring 13 is bent around under tension so that a further opening is retained by head 17 of rivet 20 in a compressed state. It is obvious that when brake lining 10 wears down to the level of rivet head 15 so that rivet head 15 is worn off the top of rivet 20, it will release the rivet from within the interior of the brake shoe so that the spring will assume its position as shown in broken line. Its end 18 will then be positioned against the revolving brake drum so that rubbing contact between the spring and the drum will make an audible signal. The device of FIGS. 1–5 is easy to assemble since in one operation, the rivet having head 15 can be inserted into stud 21 so that the top walls 9 can be swaged into a cone-shaped configuration to capture stud head 15 as shown in FIG. 5. The rivet and spring assembly of FIG. 5 can then be inserted through opening 22 of shoe surface 11 and then a mandrel type pressure tool can be pressed against rivet head 15 so as to expand cone-shaped walls 9 into the elbow configuration as shown in FIG. 1. Thus, rivet 20 will be automatically captured within the brake shoe and the spring indicating means will also be retained with the rivet until the lining wears down rivet head 15. Rivet head 15 is preferably constructed of a softer metal then the brake drum so as not to score a ring into the brake drum as it is wearing down. Stud 21 can be constructed of any rigid metal that is also preferably softer than the brake drum so as not to damage the drum.

The embodiment of FIGS. 6–10 differs slightly from the embodiment of FIGS. 1–5 in that stud 21' is constructed of a resilient or plastic material such as a high temperature Teflon. Captured within the resilient hollow body of stud 21' is a rivet 20' which has a head 5 and a recess 4 as shown in detail in FIG. 9 for capturing spring 13'. Spring 13' is shown having double sized openings in FIG. 7 so that aperture 7 is larger in diameter than the cone-shaped end of stud 21 whereas opening 6 has a smaller diameter approximately equal in diameter to groove 3 as shown in FIG. 8. This will permit the base portion 13' to be pushed down over the top of stud 21' through opening 7 and allow opening 6 to be slid sideways into groove 3 when the stud is assembled in shoe 11. The bottom rim 24 of the head of stud 21' is slightly larger in diameter than opening 22 so that the stud can be resiliently pressed through opening 22 until the base rim 24 of the cone springs outward over the opening to prevent withdrawal of the stud. The use of the resilient stud over the rigid metal stud of FIG. 1 eliminates the need to have a mandrel or swaging tool compress the head of the stud after it is inserted into the brake shoe. Moreover, the use of the manual stud 21' eliminates the need for any installation tools so that the stud can be pressed by hand into any brake shoe having a recessed opening 14 with a slightly smaller bore 22 in the surface 11 of the shoe. In a manner similar to that with respect to the embodiment of FIGS. 1–5, when lining 10 wears down head 15' of rivet 20', the compressed energy stored within spring 13' will cause it to expand open so that its end 18' will strike moving brake drum 8 and cause an audible alarm sound.

Referring to FIGS. 11–13 there is shown a modified version of the embodiment of FIGS. 6–10, wherein a spring 30 is bent in a U-shape back to rivet 5 and retained beneath an L-shaped portion 33. Brake lining 10 need not have an aperture completely through but can be provided with a hidden aperture 34 slightly larger than opening 22 in surface 11. Resilient stud 21' can be inserted into the brake shoe in a manner identical to that of the embodiment of FIG. 6, so that U-shaped indicating spring 30 is retained in a compressed state with its end 32 retained against L-shaped portion 33. As shown in broken line, as soon as rivet head 15' is worn down and the rivet is released, spring 30 will open to permit its end 32 to engage revolving brake drum 8.

Referring to FIGS. 14–16 there is shown still a further embodiment of the invention wherein spring 40 includes a U-shaped knock-out portion 47 having an aperture for receiving head 45 of Rivet 48. This rivet can be any conventional rivet having an enlarged head 44 sufficient to secure knock-out portion 47 against surface 11 in opening 22. At the edge of brake shoe surface 11 is formed a cut-out 43 in order to allow the flanged end 41 of spring 40 to project against a recess portion 42 of lining 10. It is obvious that when lining 10 wears down to the level of recess 42, flanged end 41 of spring 40 will then project into its position as shown in dotted line and begin contacting the brake drum. In its position shown in solid line in FIG. 14, spring 40 is held in tension against surface 42.

In the embodiment of FIGS. 17–20, there is shown still a further modification of the invention utilizing a U-shaped spring loaded clip 50 which is retained within an opening 54 formed in shoe surface 11. Clip 50 has L-shaped side brackets 55 which are biased against the sides of opening 54 and which engage the lower portion of surface 11, and expandable tabs 57 which engage the upper portion of surface 11. The slip includes an engaging end 52 which abuts against a projection 53 formed within brake lining 10. Projection 53 is preferably hollowed out with a hemisphere so that when lining 10 wears down to approximately the depth of surface 56 of the lining, projection 53 will break off to allow the clip to expand into the position shown in broken line in FIG. 17 or 19 and permit indicating ends 51 to engage rotating drum 8.

Figure 26:
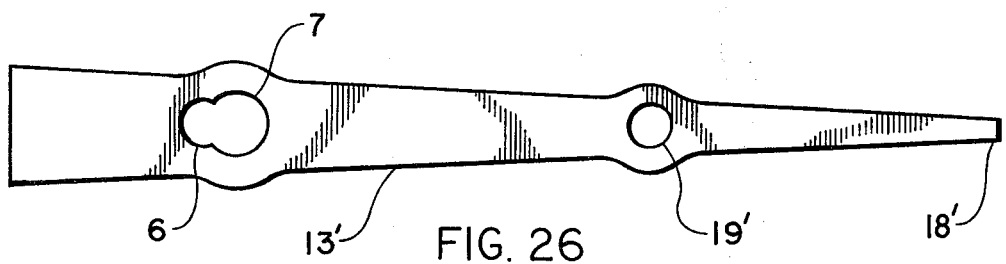
Figure 27:
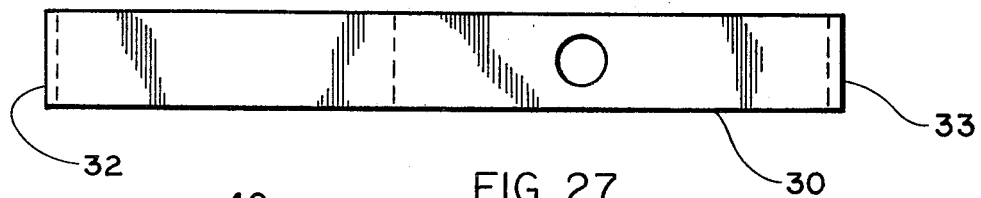
Figure 28:
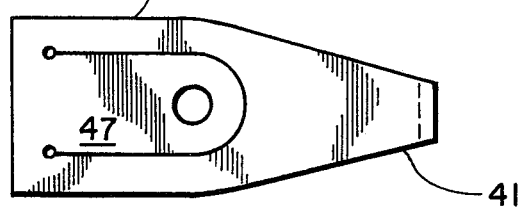
Figure 29:
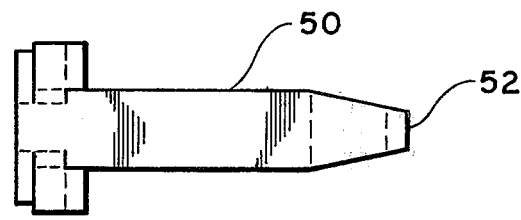
Figure 30:
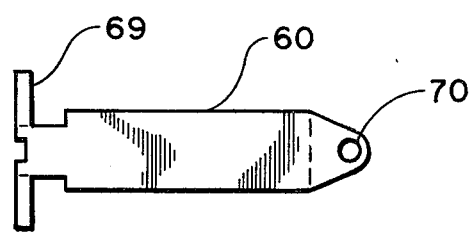
Figure 31:
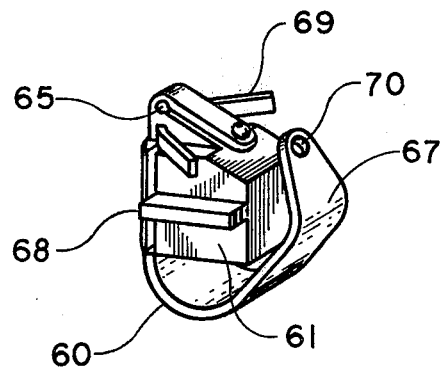
FIG. 31 shows the embodiment of FIG. 30 assembled for installation into a brake lining.

FIGS. 21–24 show a further modification of the embodiment of FIGS. 17–20 utilizing a spring loaded clip 60 which is retained through an opening 62 by means of a resilient or plastic stud 61 into a recess 63 of brake lining 10. The indicating end 67 of spring clip 60 includes an opening 70 which is engaged to a button projection 66 on a bent over flap 64 of resilient stud 61. Flap 64 is slotted by means of a slot 65 at the upper end of its sloping profile so that when brake lining 10 wears below the level of surface 63 and wears through the top of flap 64 into enlarged slot 65, the slope will become disengaged from resilient stud 61 to permit indicating end 67 to assume its position in dotted line, and engage against rotating drum 8. In a manner similar with respect to the embodiment of FIGS. 17–20, resilient member 61 includes flanges 68 to prevent it from passing through opening 62 and expansion members 69 which expand within recess portion 63 of brake lining 10 so that resilient member 61 will not become accidentally dislodged through opening 62. FIGS. 25–31 are detailed views of the spring loaded indicating members used in the embodiments of FIGS. 1–24. The spring indicating member 13 is shown in flattened out detail with its openings 2 and 19 and its indicating end 18 as utilized in the embodiment of FIGS. 1–5. FIG. 26 is a top plan view of the spring indicating member 13' used in the embodiment of FIGS. 6–10. FIG. 27 shows the spring indicating member 30 used in the embodiment of FIGS. 11–13. FIG. 28 shows a plan view of the spring indicating member 40 used in the embodiment of FIGS. 14–16. FIG. 29 shows the spring indicating clip 50 used in the embodiment of FIGS. 17–20 before being formed. FIG. 30 shows the spring indicating clip 60 used in the embodiment of FIGS. 21–24 and FIG. 31 shows the clip of FIG. 30 in its bent and assembled condition on its resilient member 61.

All of the spring members of FIGS. 25-30 are preferably constructed of a spring steel so that they can be easily spring loaded into position for engagement within the rivet openings or a recessed opening of the brake lining in an energized folded position. Upon the release of the ends of these spring members to the revolving brake drum, a loud audible noise can be heard by the motorist to give an audible indication that the brake linings are in need of replacement.

While several embodiments of the present invention have been shown and described, it will be obvious to those skilled in the art that many changes and modifications may be made thereunto without departing from the spirit and scope of the invention.

What is claimed is:

1. A device for indicating the wear of a brake lining secured on a brake shoe within a brake drum wherein the brake shoe includes at least one opening, comprising:
    a stud having a central aperture for securement into the opening of said brake shoe;
    said stud being constructed of a resilient material including a flange integrally formed in one end with a diameter larger than the opening of said brake shoe to prevent said stud from passing into said brake shoe and a cone-shaped tip formed at the opposite end so that said stud can be compressibly inserted into the opening to permit said cone-shaped end to expand against the brake shoe to prevent the withdrawal of the stud;
    a rivet pin slidably disposed in the aperture of said stud, and having an enlarged head on one end disposed a predetermined depth below the wearing surface of the brake lining, said pin head being larger in diameter than the aperture of said stud;
    spring indicating means coupled to the opposite end of said rivet pin and secured to said stud for biasing said pin with a withdrawal force with respect to said stud, said spring means including a free end disposed within the brake drum so that when the surface level of the brake lining wears down to the level of said rivet head and the rivet head is worn off, said spring means will pull the opposite end of said pin through the central aperture of said stud so as to permit the free end of said spring means to contact the brake drum and produce an audible signal.

2. The device as recited in claim 1 wherein said stud is constructed of metal and is swaged into the opening of the brake shoe.

3. The device as recited in claim 1 wherein said spring means comprises a C-shaped leaf spring having a first opening formed therein for receiving the stud and a second opening formed adjacent the opposite end of said spring for receiving said rivet.

4. The device as recited in claim 1 wherein said spring means comprises a C-shaped spring having a first opening consisting of an enlarged hole having a diameter larger than the cone-shaped end of said stud and a second smaller opening formed adjacent and in communication with said first hole which is approximately equal in diameter to groove of said stud.

5. The device as recited in claim 1 wherein said spring means comprises a U-shaped spring having a first surface secured by said stud and a second surface secured by said rivet to said stud, said spring means including a second U-shaped extending end secured under tension by said first surface so that when said rivet head is worn down, said first U-shaped surface will remove said rivet from said stud to cause said second U-shaped surface disposed on the free end of said spring to expand against the brake drum and to cause an audible sound.

6. A device for indicating the wear of a brake lining secured on a brake shoe within a brake drum wherein the brake shoe includes at least one opening comprising:
    a flat leaf spring having a central portion expanded under tension out of the plane of said spring, said central portion including an aperture, and a U-shaped extension formed on the end of said flat leaf spring, said projecting end extending perpendicular with respect to the plane of said flat leaf spring;
    a rivet having a flange on one end and pressed through the central opening of said flat spring means and passed through the opening of the brake shoe, said rivet being swaged for securement into the brake shoe and recessed below the brake lining;
    the brake lining and brake shoe having an aperture formed along one edge to receive the end of said spring, said aperture being disposed within the brake lining at a predetermined depth below its surface so that when the brake lining wears to that predetermined depth, the end of said spring will engage the rotating brake drum to produce an audible sound.

7. A device for indicating the wear of a brake lining secured on a brake shoe within a brake drum, the brake shoe being formed with an opening along one edge and the brake lining being recessed within that opening to define a projection directed towards said brake shoe comprising:
    a U-shaped spring having one leg secured to the brake shoe and having its other leg defining the free end of said spring engaging in compression the projection of the brake lining below the wearing surface of the lining so that when the lining wears to the level of the projection, the projection will be released to release said spring, the indicating end of said spring engaging said rotating brake drum to cause an audible sound.

8. The device as recited in claim 7 wherein said brake lining projection is hollowed out.

9. A device for indicating the wear of a brake lining secured on a brake shoe within a brake drum wherein a brake shoe includes at least one opening formed along the edge of said shoe comprising:
    a resilient stud for securement within the opening of said brake shoe and having an inclined flap projecting within a hollowed out portion of said brake lining below the wear surface of said lining, said flap having its end connection to said stud defining the predetermined depth of wear of said lining; and
    a U-shaped spring having one leg secured to said stud and having its other leg secured and tensioned to said flap so that when the end of said flap wears away at the predetermined level of said brake lining, the free end of said U-shaped spring will open outwardly against the rotating brake drum to produce an audible sound.

10. The device as recited in claim 9 wherein said stud is constructed of a plastic material and includes at least one flange for securement against the edge of the brake shoe within said opening.

* * * * *